United States Patent Office 3,346,655
Patented Oct. 10, 1967

3,346,655
PREPARATION OF UNSATURATED SIDE CHAIN CYCLOALKANES
George R. Lester, Park Ridge, Ill., assignor to Universal Oil Products Company, Des Plaines, Ill., a corporation of Delaware
No Drawing. Filed Oct. 7, 1965, Ser. No. 493,907
9 Claims. (Cl. 260—666)

This invention relates to a process for the preparation of certain unsaturated compositions of matter. More particularly, the invention is concerned with a method for preparing cycloalkyl hydrocarbons containing an unsaturated side chain substituent.

With the increased use of polymeric compositions of matter in various forms and which possess certain desirable physical characteristics, it is necessary that monomers which are used in the preparation of these polymers be obtained in a relatively economical manner. For example, various monomers, when polymerized, will possess different physical characteristics. Ethylene, when, polymerized, will possess varied physical properties according to the method of preparation thereof. Low molecular weight polymers are used as high grade lubricating oils or lubricating additives, the medium weight polymers are waxy by nature while the high molecular weight materials are resinous in nature. The resins possess excellent electrical properties and impermeability to various chemicals. The molded material which may be prepared, is essentially non-breakable, flexible and may if so desired, be colored. Polypropylene is highly crystalline, thermoplastic and resinous in form, the polymer possessing an extremely high tensile strength and rigidity and may be used as films for packaging, as molded parts for use in automobiles, utensils, appliances, etc., as bottles, pipe and tubing or as filments in fibers, ropes, etc. Likewise, polymerized styrene is an important polymer in the present day chemical world, being an important resin or plastic. Polystyrene possesses an excellent insulating power and may be used for refrigerators and air conditioners, for packaging and foams, and impregnation and lamination and in molded form as containers, handles, fan blades, wall tile, etc.

In this respect, another chemical monomer which may be polymerized to form a polymer which possesses useful physical properties comprises a cycloalkyl compound which contains an unsaturated side chain substituent. A polymer prepared from the aforementioned monomers will possess many properties similar in nature to polystyrene. However, the light absorption of this polymer will differ from that of polystyrene due to the saturation of the ring as opposed to the aromatic unsaturation of the styrene ring. One such composition of matter comprises vinylcyclohexane. Heretofore, the preparation of this monomer was difficult and expensive inasmuch as direct reduction of vinylcyclohexene would preferentially reduce the double bond of the vinyl substituent before saturating the olefinic ring.

It is therefore an object of this invention to provide a process for the preparation of industrially important chemicals.

A further object of this invention is to provide a process for preparing cycloalkyl hydrocarbons possessing unsaturated side chain substituents, said compounds being useful as monomers in the preparation of polymeric resins or plastics.

In one aspect, an embodiment of this invention is found in a process for the preparation of a cycloalkane containing an unsaturated side chain hydrocarbon substituent, which comprises photochemically reacting a cycloalkene containing an unsaturated side chain substituent with a carbonyl compound, treating the resultant product with hydrogen in the presence of a hydrogenation catalyst, thereafter decomposing the resultant hydrogenated product, and recovering the desired cycloalkane containing an unsaturated side chain hydrocarbon substituent.

Another embodiment of this invention is found in a process for the preparation of a cycloalkane containing an unsaturated side chain hydrocarbon substituent, which comprises photochemically reacting a cycloalkene containing an unsaturated side chain substituent with a carbonyl compound at a temperature in the range of from about ambient to about 100° C., treating the resultant product with hydrogen in the presence of a hydrogenation catalyst at hydrogenation conditions including a temperature in the range of from about ambient to about 75° C. and at a pressure in the range of from about 10 to about 200 pounds per square inch, thereafter decomposing the resultant hydrogenated product by treatment with an inorganic acid at ambient temperature and atmospheric pressure, and recovering the desired cycloalkane containing an unsaturated side chain hydrocarbon substituent.

A specific embodiment of this invention is found in a process for the preparation of vinylcyclohexane which comprises reacting 4-vinylcyclohexene with benzophenone by irradiation with an ultraviolet light source in the range of from about 2700 to about 5000 A. at a temperature in the range of from about ambient to about 100° C., treating the resultant product with hydrogen in the presence of a nickel hydrogenation catalyst at a temperature in the range of from about ambient to about 75° C. and a pressure in the range of from about 10 to about 200 pounds per square inch, thereafter decomposing the resultant hydrogenated product by treatment with sulfuric acid at ambient temperature and atmospheric pressure, and recovering the desired vinylcyclohexane.

Other objects and embodiments will be found in the following further detailed description of this invention.

As hereinbefore set forth, the present invention is concerned with a process for preparing cycloalkyl hydrocarbons containing an unsaturated side chain, said process being effected in a series of steps hereinafter set forth in greater detail. It is contemplated within the scope of this invention that starting materials for this process will comprise cycloalkene hydrocarbons containing an unsaturated side chain hydrocarbon substituent. Examples of these compounds which may be utilized as starting materials include vinylcyclohexene, allylcyclohexene, methallylcyclohexene, crotonylcyclohexene, pentonylcyclohexene, vinylcycloheptene, allylcycloheptene, methallylcycloheptene, crotonylcycloheptene, etc. For purposes of this invention the position of the double bond in the ring in relation to the unsaturated side chain is immaterial, the isomeric cyclohexenes containing the unsaturated side chain substituents can include 1-vinyl-, 3-vinyl-, 4-vinyl-, 1-allyl-, 3-allyl-, 4-allyl-, etc., 1-cyclohexenes.

The process of preparing the desired product is effected by reacting the cycvloalkene containing the unsaturated side chain substituent with a carbonyl compound, preferably a ketone such as acetone, methyl ethyl ketone, methyl propyl ketone, methyl butyl ketone, diethyl ketone, ethyl propyl ketone, ethyl butyl ketone, dipropyl ketone, acetophenone, ethyl phenyl ketone, ethyl propyl ketone, benzophenone, etc. The reaction between the cycloalkene and the carbonyl compound is effected in a photochemical manner in the presence of an ultraviolet light source which preferably has a wavelength between 2700 and 5000 A. An especially preferred light source comprises a medium pressure mercury arc lamp. These lamps usually contain a small amount of mercury vapor and a large amount of a rare gas, the total pressure being above atmospheric. These mercury arc lamps possess strong emission lines at 2900 A. and 3660 A., among others. Another source which may be utilized comprises a specially prepared fluorescent light which will also emit energy to the desired wavelengths, that is, a large portion of wavelengths not higher than about 3700 A. The conditions under which this reaction is effected will usually include temperatures ranging from about ambient (about 25° C.) to about 100° C. and at atmospheric pressure although it is also contemplated within the scope of this invention that higher pressures ranging up to about 1000 pounds per square inch may be utilized, the pressure being that which is sufficient to maintain a major portion of the reactants in the liquid phase. The reaction between the carbonyl compound and the cycloalkene containing the unsaturated side chain will result in the formation of an oxetane. This photocycloaddition of the carbonyl to the olefinic side chain occurs due to the excitement of the carbonyl compound by the irradiation from the ultraviolet light source and will thus add as a diradical across the double bond of the unsaturated side chain.

Following the preparation of the oxetane which, in effect, blocks one of the double bonds which preferentially comprises the olefinic side chain double bond, the oxetane is selectively hydrogenated. This hydrogenation is effected by treating the oxetane with hydrogen in the presence of a hydrogenation catalyst at relatively mild hydrogenation conditions whereby the double bond in the cycloalkene ring will be saturated. This hydrogenation will be effected by utilizing any hydrogenation catalyst well known in the art including, but not limited to, nickel, either per se or composited on a suitable support, platinum, palladium or other metals of Group VIII of the Periodic Table, alone, in combination, or composited on suitable supports. The hydrogenation conditions, as hereinbefore set forth, may be considered relatively mild in nature and will include temperatures ranging from ambient (about 25° C.) up to about 75° C. and pressures ranging from about 10 to about 200 pounds per square inch of hydrogen. This is in contradistinction to the usual operating conditions under which the hydrogenation is effected, such conditions usually including temperatures ranging from about 100° to about 250° C. and pressures ranging from about 200 to about 1000 pounds per square inch.

Following the hydrogenation whereby the ring is saturated, the desired product is obtained by decomposing the oxetane. This decomposition of the oxetane is effected by treating said compound with an inorganic acid such as sulfuric acid, hydrochloric acid, phosphoric acid, etc., at ambient temperature and atmospheric pressure.

The process of the present invention may be effected in any suitable manner and may comprise either a batch or continuous type operation. For example, when a batch type operation is used, a quantity of the cycloalkene containing an unsaturated side chain and the carbonyl compound is placed in an appropriate apparatus such as quartz reactor or a reactor made of a synthetic material known in the trade as Vycor. The cycloalkene and the carbonyl compound may be dissolved in a substantially inert organic solvent, said solvent including aromatic hydrocarbons such as benzene, toluene, xylene, ethylbenzene, etc., or paraffinic hydrocarbons both cyclic and aliphatic in nature such as methylcyclopentane, n-heptane, etc. The resultant solution is irradiated under an inert atmosphere such as nitrogen, by means of an external light source which has a wavelength in the range of from about 2700 to about 5000 A. for a predetermined residence time. At the end of this time, the resultant oxetane is recovered and separated from the solvent and any unreacted starting materials which may still be present. After purification of the oxetane, it is then placed in a hydrogenation apparatus and subjected to hydrogenation in the presence of a hydrogenation catalyst under the conditions hereinbefore set forth in greater detail utilizing a pressure of from about 10 to about 200 pounds per square inch of hydrogen. Following this, the hydrogenated oxetane is recovered and placed in yet another apparatus where said compound is decomposed by treatment with an inorganic acid. The desired product which comprises a cycloalkane containing an unsaturated side chain is thereafter recovered by conventional means after separation from the acid and any unreacted oxetane.

It is also contemplated within the scope of this invention that the process may be effected in a continuous manner of operation. When such a type of operation is used, the starting materials comprising the cycloalkene containing an unsaturated side chain and the carbonyl compound of the type hereinbefore set forth in greater detail are continuously charged to a reaction vessel comprising a quartz or Vycor tube after being dissolved in a substantially inert organic solvent. The mixture is subjected to irradiation for a predetermined residence time during passage through the tube, said irradiation being provided by means of an external ultraviolet lamp which possesses the desired wavelength resonance emission. The reactor effluent is continuously withdrawn and passed to a hydrogenation apparatus wherein hydrogenation is effected in the presence of a hydrogenation catalyst and the desired pressure of hydrogen. Following this, the hydrogenated oxetane is continuously passed to a third reaction vessel where decomposition of said oxetane is effected by treatment with an inorganic acid. It is to be understood that each of the three reaction zones are maintained at the proper operating conditions of temperature and pressure. In addition, it is also understood that the reactor effluent which is continuously withdrawn from each of the reaction zones is subjected to a separation step whereby the desired product in each instance is separated from any unreacted starting materials, solvents, etc., the latter compounds being recycled to form a portion of the feed stock while the desired product is charged to the next step of the operation and finally to recovery and storage.

Examples of cycloalkanes containing an unsaturated side chain which may be obtained according to the process of this invention include vinylcyclohexane, allylcyclohexane, methallylcyclohexane, crotonylcyclohexane, vinylcycloheptane, allylcycloheptane, methallylcycloheptane, etc.

The following examples are given to illustrate the process of the present invention which, however, are not intended to limit the generally broad scope of the present invention in strict accordance therewith.

*Example 1*

A solution of 11 g. (0.1 mole) of 4-vinylcyclohexene and 21 g. (0.1 mole) of benzophenone was placed in a Vycor flask. Nitrogen was pressured in and the solution was irradiated at a wavelength of 2500–5000 A. by means of an external ultraviolet lamp comprising a medium pressure mercury resonance apparatus for a period of about 52 hours at 33° C. At the end of this time, irradiation was discontinued and the desired product comprising the oxetane was recovered. A gas-liquid chromatographic analysis showed the disappearance of 61% of the benzophenone and 33% of the 4-vinylcyclohexene.

The oxetane which is prepared according to the above paragraph is then placed in the glass liner of a rotating autoclave along with a hydrogenation catalyst comprising nickel composited on alumina. The flask is sealed and hydrogen pressured in until a pressure of about 100 pounds per square inch is reached. The apparatus is then heated to a temperature of about 50° C. and maintained thereat for a period of about 4 hours. During this time, there is a noticeable pressure drop of the hydrogen. At the end of this time, the excess pressure is vented and the reaction product recovered. The product is separated from the catalyst and placed in a flask along with 1.0 cc. of sulfuric acid. The flask is allowed to remain at room temperature for a period of about 8 hours, after which the reaction product is recovered, separated from the sulfuric acid and subjected to fractional distillation under reduced pressure, the desired product comprising vinyl cyclohexane being recovered therefrom.

*Example II*

In this example, a solution comprising 21 g. (0.1 mole) of benzophenone and 12 g. (0.1 mole) of 4-allyl cyclohexene dissolved in 700 cc. of benzene is placed in a quartz vessel. The solution is thereafter irradiated by means of an external ultraviolet lamp comprising a mercury resonance lamp for a period of about 48 hours at 35° C. At the end of this time, irradiation is discontinued, the reaction product is separated from the solvent and recovered. The oxetane is then placed in a glass liner of a rotating autoclave along with a hydrogenation catalyst comprising a nickel composited on alumina. The liner is sealed and hydrogen pressed in until a pressure of 100 pounds per square inch is reached. Following this, the autoclave is heated to a temperature of about 50° C. and maintained thereat for a period of 4 hours. At the end of this time, the excess pressure is vented and the reaction product separated from the hydrogenation catalyst. The product is then placed in a flask along with a small amount of sulfuric acid and allowed to remain at room temperature for a period of about 8 hours. At the end of this time, the reaction product is separated from the sulfuric acid and subjected to fractional distillation under reduced pressure, the desired product comprising allylcyclohexane being recovered therefrom.

*Example III*

A solution comprising 21 g. (0.1 mole) of benzophenone and 13.7 g. (0.1 mole) of 4-methallyl cyclohexene in 700 cc. of toluene is placed in a Vycor flask. Following this, the solution is irradiated at a temperature of about 35° C. for a period of about 50 hours, said irradiation being effected by exposing the Vycor flask to the emanation from a medium pressure mercury resonance lamp. At the end of the 50 hours, the reaction product is separated from the solvent and recovered. Following this, the oxetane is then placed in the glass liner of a rotating autoclave along with the hydrogenation catalyst of the type hereinbefore set forth in greater detail and treated in a manner similar to that set forth in Examples I and II above. Following the hydrogenation of the oxetane, the excess pressure in the autoclave is vented and the reaction product recovered after separation from the hydrogenation catalyst.

The oxetane is then placed in a flask along with a small amount of sulfuric acid and allowed to remain at room temperature for a period of about 16 hours. At the end of this time the mixture is separated from the sulfuric acid and subjected to fractional distillation under reduced pressure, the desired methallylcyclohexane being recovered therefrom.

*Example IV*

A toluene solution having dissolved therein 0.1 mole of acetone and 0.1 mole of 4-crotonylcyclohexene is irradiated by means of an ultraviolet light in a manner similar to that set forth in Example I above. The resultant oxetane is separated from the solvent upon completion of the irradiation and placed in a glass liner of a rotating autoclave along with a nickel hydrogenation catalyst. The autoclave is sealed and hydrogen pressed in until an initial pressure of 200 pounds per square inch is reached. The autoclave is then heated to a temperature of 35° C. and maintained thereat for a period of about 4 hours, during which time a noticeable hydrogen pressure drop will occur. At the end of the residence time, the excess pressure is vented and the reaction mixture recovered. After separaton of the hydrogenated product from the catalyst, the former is placed in a flask along with a small amount of hydrochloric acid and the mixture is allowed to stand at room temperature for a period of about 8 hours. At the end of this time, the mixture is separated from the acid and subjected to fractional distillation under reduced pressure, the desired crotonylcyclohexane being recovered therefrom.

I claim as my invention:

1. A process for the preparation of a vinylcyclohexane which comprises photochemically reacting a vinylcyclohexene with a ketone by irradiation at a wavelength of from about 2700 to about 5000 A. at a temperature in the range of from about ambient to about 100° C., reacting the resultant product with hydrogen in the presence of a hydrogenation catalyst at hydrogenation conditions including a temperature in the range of from about ambient to about 75° C. and at a pressure in the range of from about 10 to about 200 pounds per square inch, thereafter decomposing the resultant hydrogenated product by treatment with an inorganic acid at ambient temperature and atmospheric pressure, and recovering the resultant vinylcyclohexane.

2. A process for the preparation of vinylcyclohexane which comprises reacting 4-vinylcyclohexene with benzophenone by irradiation with an ultraviolet light source in the range of from about 2700 to about 5000 A. at a temperature in the range of from about ambient to about 100° C., reacting the resultant product with hydrogen in the presence of a nickel hydrogenation catalyst at a temperature in the range of from about ambient to about 75° C. and a pressure in the range of from about 10 to about 200 pounds per square inch, thereafter decomposing the resultant hydrogenated product by treatment with sulfuric acid at ambient temperature and atmospheric pressure, and recovering the desired vinylcyclohexane.

3. A process for the preparation of allylcyclohexane which comprises reacting 4-allylcyclohexene with benzophenone by irradiation with an ultraviolet light source in the range of from about 2700 to about 5000 A. at a temperature in the range of from about ambient to about 100° C., reacting the resultant product with hydrogen in the presence of a nickel hydrogenation catalyst at a temperature in the range of from about ambient to about 75° C. and a pressure in the range of from about 10 to about 200 pounds per square inch, thereafter decomposing the resultant hydrogenated product by treatment with sulfuric acid at ambient temperature and atmospheric pressure, and recovering the desired allylcyclohexane.

4. A process for the preparation of methallylcyclohexane which comprises reacting 4-methallylcyclohexene with benzophenone by irradiation with an ultraviolet light source in the range of from about 2700 to about 5000 A. at a temperature in the range of from about ambient to about 100° C., reacting the resultant product with hydrogen in the presence of a nickel hydrogenation catalyst at a temperature in the range of from about ambient to about 75° C. and a pressure in the range of from about 10 to about 200 pounds per square inch, thereafter decomposing the resultant hydrogenated product by treatment with sulfuric acid at ambient temperature and atmospheric pressure, and recovering the desired methallylcyclohexane.

5. A process for the preparation of crotonylcyclohexane which comprises reacting 4-crotonylcyclohexene with acetone by irradiation with an ultraviolet light source in the range of from about 2700 to about 5000 A. at a temperature in the range of from about ambient to about 100° C., reacting the resultant product with hydrogen in the presence of a nickel hydrogenation catalyst at a temperature in the range of from about ambient to about 75° C. and a pressure in the range of from about 10 to about 200 pounds per square inch, thereafter decomposing the resultant partially hydrogenated product by treatment with hydrochloric acid at ambient temperature and atmospheric pressure, and recovering the desired crotonylcyclohexane.

6. The process of claim 1 further characterized in that said acid is sulfuric acid.

7. The process of claim 1 further characterized in that said acid is hydrochloric acid.

8. The process of claim 1 further characterized in that said ketone is benzophenone.

9. The process of claim 1 further characterized in that said ketone is acetone.

References Cited

UNITED STATES PATENTS

| 3,052,737 | 9/1962 | Slaugh | 260—666 |
| 3,146,180 | 8/1964 | Cenci | 204—162 |

OTHER REFERENCES

Heterocyclic Compounds, Part 2, Ed. A. Weissberher, Interscience Publisher, chapter IX, Oxetanes, by Scott Searles, Jr., 1004–1005, 1964.

DELBERT E. GANTZ, *Primary Examiner.*

V. O'KEEFE, *Assistant Examiner.*